United States Patent

DuRocher

[15] 3,707,694
[45] Dec. 26, 1972

[54] THERMALLY SENSITIVE CIRCUIT CONTROL APPARATUS

[72] Inventor: Gideon A. DuRocher, Mt. Clemens, Mich.

[73] Assignee: Essex International, Inc., Fort Wayne, Ind.

[22] Filed: March 9, 1970

[21] Appl. No.: 17,420

[52] U.S. Cl................................337/139, 337/393
[51] Int. Cl......H01h 37/46, H01h 61/00, G01k 5/48
[58] Field of Search........337/89, 111, 139, 140, 382, 337/393, 335, 336, 337, 338, 339, 340, 383, 38, 40; 200/1 TK, 16 A, 153 K, 166 J

[56] References Cited

UNITED STATES PATENTS

| 3,634,803 | 1/1972 | Willson et al | 337/140 X |
| 3,594,675 | 7/1971 | Willson | 337/140 |
| 3,594,674 | 7/1971 | Willson | 337/139 |
| 3,256,401 | 6/1966 | Dawson | 200/166 J X |
| 3,471,819 | 10/1969 | Gianola et al | 337/336 |
| 3,516,082 | 6/1970 | Cooper | 337/382 X |
| 3,403,238 | 9/1968 | Buehler et al | 337/140 UX |

FOREIGN PATENTS OR APPLICATIONS

| 437,481 | 11/1967 | Switzerland | 337/335 |

Primary Examiner—Bernard A. Gilheany
Assistant Examiner—Dewitt M. Morgan
Attorney—Learman & McCulloch

[57] ABSTRACT

Circuit control apparatus responsive to temperature variations comprises an electrical conductor having an initial configuration and composed of a homogeneous nickel-titanium alloy in such proportions that its shape changes to a different, predetermined configuration in response to its temperature reaching a predetermined, critical temperature. Until the temperature of the conductive member reaches its critical temperature, the member is substantially immune to temperature variations.

17 Claims, 5 Drawing Figures

PATENTED DEC 26 1972

3,707,694

INVENTOR.
GIDEON A. DUROCHER
BY
Learman & McCulloch

THERMALLY SENSITIVE CIRCUIT CONTROL APPARATUS

The invention disclosed herein relates to thermally sensitive control means for an electric circuit and more particularly to means operable to make and break an electric circuit in response to changes in temperature. The invention is particularly adapted for use in circuit breakers, thermostats, intermittently operable devices such as flashers, and the like, but it has utility in any other kinds of circuits wherein thermal control of such circuits is desirable.

Conventional circuit control devices of the general class to which the invention relates primarily utilize bi-metallic elements comprising two metals having different thermal properties so that variations in temperature affect the configuration of the element. Such devices are expensive to manufacture and are troublesome in operation for a number of reasons. For example, a bi-metallic element is responsive to all temperature changes, thereby resulting in a control device which creeps as its temperature varies. In many instances the force under which contacts are maintained in engagement is due directly to the configuration of a bi-metallic element and if its configuration varies with relatively small variations in temperature, the contact pressure also varies with possible adverse effects on the contacts. In addition, the calibration of devices incorporating bi-metallic controls is difficult due to variations in temperatures between the calibrating site and the use site so it has been common heretofore to overstress the parts of such devices so that they require the application of substantial operating forces to function. This practice in constructing known devices results in the need for component parts such as springs, special heaters, and the like, in addition to the parts required for circuit control, the additional parts being for the purpose of modifying or accentuating the normal operating tendencies of the circuit controlling parts.

Conventional control devices having contacts movable into and out of engagement with one another suffer from the disadvantage that repeated making and breaking of a circuit causes deterioration of the contacts due to arcing. This characteristic of known devices is accelerated in those instances in which the relative positions of the contacts are determined by the configuration of a bi-metallic element, and especially if the configuration of the bi-metallic element varies with small changes in its temperature. To compensate for this, it has been customary heretofore to incorporate with a bi-metallic element auxiliary apparatus operable to enable the bi-metallic element to have a certain amount of lost motion followed by a snap action change of configuration so as to effect rapid movement of the contacts into and out of engagement, thereby minimizing contact damage due to arcing. The auxiliary structure necessary to achieve snap action operation represents an added expense, however, and further complicates calibration of the device with which it is associated.

An object of this invention is to provide thermally sensitive circuit control apparatus which overcomes or greatly minimizes the disadvantages of previously known devices for similar purposes.

Another object of the invention is to provide a thermally sensitive control device which is capable of changing from any one of a number of configurations to a predictable configuration in response to heating of the control device to a predetermined temperature.

A further object of the invention is to provide a control device of the character referred to in which the change of configuration thereof is inconsequential until it is heated to its predetermined temperature, whereupon the control device changes suddenly to the predicted configuration.

Another object of the invention is to provide wherein the change of configuration to the predicted configuration is accompanied by the generation of sufficient force to enable substantial work to be accomplished by the control device.

Other objects and advantages of the invention will be pointed out in detail or will become apparent from the following description when it is considered in conjunction with the appended claims and the accompanying drawings, in which:

In each of the embodiments hereinafter described the operation of the apparatus depends upon the utilization of an electrically conductive, homogeneous member formed of a nickel-titanium alloy which possesses properties uniquely suited to constructions of the kind disclosed herein. A strip of homogeneous nickel-titanium alloy is substantially impervious to temperature variations until such time as a predetermined and critical temperature is reached. At that time the strip automatically changes from any other configuration it assumes to a predetermined memory configuration. The memory configuration is one to which the strip is shaped while at a temperature at or above a critical temperature. Once the strip is shaped at its critical temperature, and then is permitted to cool below its critical temperature, the strip may be reshaped at the lower temperature to any desired configuration. The strip will maintain the latter configuration until such time as it is heated to its critical temperature, whereupon it will suddenly and forcefully reassume its memory configuration. Of particular advantage, however, is that the configuration of the strip undergoes substantially no variation until the critical temperature is reached.

The critical temperature of a particular alloy is directly related to the proportions of nickel and titanium of which the alloy is composed. Below is a table listing approximate critical temperatures of typical nickel-titanium alloys and wherein the alloys are composed of commercially pure nickel and commercially pure titanium in the proportions indicated:

| Wt. % Ni. | Wt. % Ti. | Critical temperature °C. |
|---|---|---|
| 53.5 | 46.5 | 98 |
| 54.0 | 46.0 | 140 |
| 54.5 | 45.5 | 170 |
| 55.0 | 45.0 | 140 |
| 55.5 | 44.5 | 30 |
| 56.0 | 44.0 | −25 |
| 56.5 | 43.5 | −50 |

The data presented in the table are not intended to be exhaustive, but are intended to illustrate that varying the Ni-Ti proportions produces marked changes in the critical temperature of an alloy.

Figure 1:
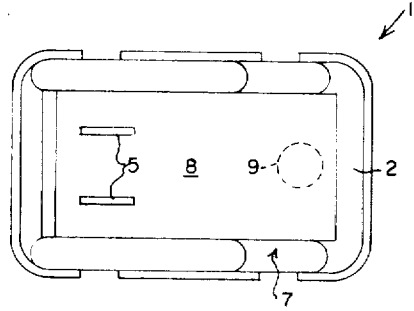
FIG. 1 is a top plan view of a circuit breaker constructed in accordance with one embodiment of the invention.
Figure 2:
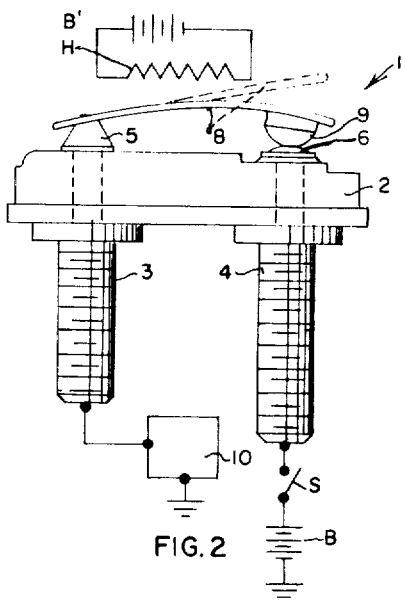
FIG. 2 is a side elevational view of the apparatus shown in FIG. 1.

The embodiment of the invention illustrated in FIGS. 1 and 2 comprises a circuit breaker 1 of the manually resettable type and comprises a base 2 formed of non-conductive material in which is fixed a pair of electrodes 3 and 4. The electrode 3 includes a conductive element 5 which passes through the base and the electrode 4 is connected to a fixed, electrically conductive contact 6.

Welded or otherwise suitably fixed to the element 5 is one end of a circuit control member 7 comprising an electrically conductive contact carrier or blade 8 formed of a homogeneous nickel-titanium alloy of the kind referred to earlier. Adjacent its other end the blade 8 carries an electrically conductive contact 9 that is adapted to engage the fixed contact 6.

An electric circuit is illustrated schematically in FIG. 2 as comprising a source of electrical energy such as a battery B that is connected through a switch S to the electrode 4. Electrical apparatus to be operated, such as an electrical heater 10, is connected to the other electrode 3. When the contacts 6 and 9 are engaged and the switch S is closed, the device 10 may be energized via the completed circuit of which the blade 8 is a part.

The specific proportions of nickel and titanium of which the member 7 is formed will depend upon the maximum temperature which the component parts of the circuit safely can withstand or, stated differently, the temperature at which it is desired that the circuit should be opened to prevent damage either to the circuit components or to apparatus in the vicinity of the circuit components. For example, if it is desired that the maximum temperature which the control blade 8 should be capable of withstanding is 170°C., the composition of the blade may be 54.5 weight percent nickel and 45.5 weight percent titanium. To enable the circuit to be opened at other temperatures, different proportions of nickel and titanium will be used in the manufacture of the blade 8.

To condition the blade 8 for operation as the control means for the circuit, it should be shaped at a temperature at or above its critical temperature in such manner that it assumes a substantially planar configuration. This establishes the normal or memory configuration of the member 8. After cooling of the member 8 to a temperature below its critical temperature, it may be deformed arcuately an amount sufficient to enable the contact 6 to be engaged by the contact 9 when the blade is assembled with the other parts of the circuit breaker. The blade 8 will maintain its arcuate configuration indefinitely unless acted upon by an outside force or unless it is heated to a temperature at or above its critical temperature. If the blade 8 is heated to a temperature above its critical temperature, say 170°C., it will undergo a transition from its arcuate configuration to its memory or planar configuration very suddenly and with a fast action. Such transition of the blade 8 will disengage the contacts 6 and 9, thereby breaking the circuit to the apparatus 10.

The blade 8 may be heated to its critical temperature by the flow of current therethrough, or by an auxiliary heater H connected to a source B' of energy, or by both.

When the circuit to the apparatus 10 is broken, the blade 8 may cool to a temperature lower than its critical temperature, but the blade 8 will remain in its normal or memory configuration, thereby precluding reclosing of the electrical circuit to the apparatus 10 unless the blade 8 is acted upon by an external biasing device.

Figure 3:
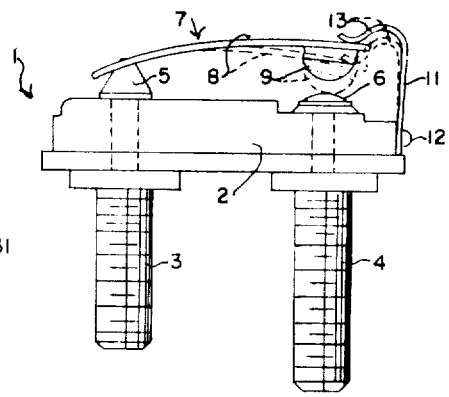

One kind of external biasing device is indicated in FIG. 3 as comprising a spring 11 that is anchored at one end to the member 2 by suitable means 12, the other end of the spring 11 having an extension 13 which overhangs the blade 8 and normally exerts sufficient force on the free end of the latter to maintain the contacts 6 and 9 engaged. In this instance it is not necessary to prebend the blade from its memory shape inasmuch as the spring will bow the blade.

In the operation of the apparatus shown in FIG. 3, the blade 8 has a normal or memory configuration which is planar. Due to the force of the spring 11, however, the blade assumes an arcuate configuration sufficient to maintain the contacts 6 and 9 engaged until such time as the blade 8 is heated to a temperature at or above its critical temperature. When the blade 8 is heated to its critical temperature, it will be deflected suddenly from its arcuate configuration towards its planar configuration, thereby displacing the spring 11 and disengaging the contacts 6 and 9. When the blade 8 cools to a temperature below its critical temperature, the spring 11 once again will be capable of deforming the blade 8 arcuately so as to reengage the contacts 6 and 9, thereupon reestablishing the circuit. The construction shown in FIG. 3, therefore, is a self-resetting circuit breaker.

Figure 4:
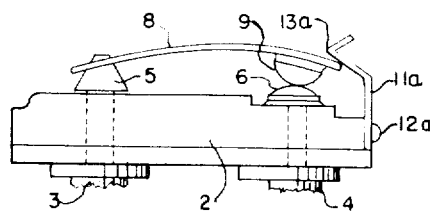
FIGS. 3 and 4 are views similar to FIG. 2, but illustrating modified forms of circuit breakers.

The embodiment of the invention disclosed in FIG. 4 is the same as that illustrated in FIG. 3 except for a modified external biasing device which enables the circuit breaker to be reset manually. In this embodiment a spring arm 11a has one end fixed to the base 2 by suitable means 12a and has at its other end a generally V-shaped detent 13a which normally overhangs the blade 8. Those portions of the spring arm on opposite sides of the detent 13a converge toward the latter so as to enable the detent to be cammed or deflected out of the path of movement of the free end of the blade 8.

In the operation of the apparatus shown in FIG. 4, the blade 8 is bowed from its planar memory configuration so that its free end normally underlies the detent 13a with the contacts 6 and 9 engaged. Should the blade be heated to its critical temperature it will return to its memory configuration, the detent 13a being cammed out of the path of the free end of the blade by the blade itself. When the blade 8 has cooled to a temperature below its critical temperature the blade may be returned manually to its bowed configuration, whereupon the detent 13a again will overlie the blade and maintain the contacts 6 and 9 engaged.

It will be apparent from the foregoing that the force required to deform the blade when the latter is at a temperature below its critical temperature is less than the force generated by the change in configuration of the blade when it is heated to its critical temperature. Because of this characteristic of the nickel-titanium alloy, overcoming of the force of the springs 11 and 11a is assured.

Figure 5:
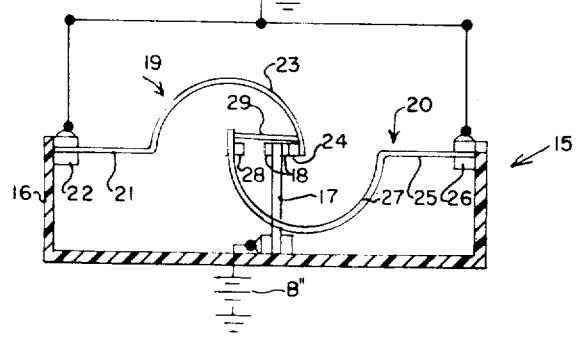
FIG. 5 is a view partly in section and partly in side elevation of a still further modified form of the invention.

The apparatus shown in FIG. 5 constitutes a flasher or control 15 for direction signaling lamps of a vehicle and comprises a base member 16 on which is secured a conductive arm 17 provided with fixed contacts 18 on opposite sides thereof. Also fixed to the support 16 is a pair of conductive carriers or arms 19 and 20 each of which is composed of a homogeneous nickel-titanium alloy. The carrier 19 includes a preferably planar blade portion 21 fixed at one end in a support 22 and having at its other end an arcuate extension 23 at the free end of which is a contact 24 which is so located as to confront and be engageable with the adjacent fixed contact 18. The carrier 20 includes a planar blade portion 25 fixed at one end in a support 26 and having at its other end an arcuate extension 27 equipped with a contact 28 that confronts and is adapted to engage the other fixed contact 18. The free ends of the arcuate portions 23 and 27 are coupled to one another and maintained in spaced apart relation by an electrically insulating member 29 that is joined at its opposite ends to the members 23 and 27.

The fixed contacts 18 are connected to a battery B" and the carriers 19 and 20 are connected to a fixed contact 30 of a conventional direction signal operating switch 31 having fixed contacts 32 and 33 connected to left hand and right hand front signaling lamps 34 and 35. The switch 31 also includes fixed contacts 36 and 37 connected to left hand and right hand rear signaling lamps 38 and 39. The switch 31 also has movable contacts 40 and 41 by means of which the left hand signaling lamps or the right hand signaling lamps may be placed in circuit with the battery B".

The carriers 19 and 20 are formed from nickel-titanium alloy having nickel-titanium proportions such as to form carriers having a desired critical temperature. The carriers preferably are of identical construction and composition. In the manufacture of the carriers 19 and 20, they will be heated to such critical temperature and shaped in such manner that the arcs of the portions 23 and 27 have relatively large radii. The carriers then may be cooled below their critical temperature and the portions 23 and 27 reshaped so that their arcs have relatively small radii. The coupling member 29 then may be joined to the members 19 and 20 and the latter assembled with the remaining apparatus in such manner that one of the contacts 24 engages a fixed contact 18. This is the condition of the apparatus shown in FIG. 5.

When the apparatus is in the condition shown in FIG. 5, operation of the direction signal switch 31 in such manner as to shift the movable contact 40 to a position in which it bridges the fixed contacts 30, 32 and 36 will complete a circuit from the battery B" through the conductor 17, through the engaged contacts 18 and 24, through the carrier 19, and through the movable contact 40 to the signaling lamps 34 and 38. As current flows through the carrier 19 the temperature of the latter will rise to the critical temperature, whereupon the radius of the arcuate portion 23 will be enlarged suddenly so as to effect movement of the free end of the latter and disengage the contact 24 from the contact 18 and open the circuit to the lamps 34 and 38. The movement of the free end of the arcuate portion 23 will be transmitted via the coupling member 29 to the free end of the arcuate portion 27 of the carrier 20 so as to reduce even more the radius thereof and effect engagement of the contact 28 with the other fixed contact 18, thereby reestablishing the circuit to the signaling lamps 34 and 38. The temperature of the carrier 20 thus will rise to its critical temperature whereupon the radius of the arcuate portion 27 will increase, effecting movement of the free end thereof to disengage the contacts 18 and 28 and open the circuit to the lamps 34 and 38. By this time the carrier 19 will have cooled to a temperature below its critical temperature, thereby enabling the movement of the free end of the carrier 20 to be transmitted to the free end of the carrier 19 so as to reestablish engagement between the contacts 18 and 24. The cycle thereupon repeats, enabling the signaling lamps 34 and 38 to flash.

The same operation results upon shifting of the movable contact 41 to a position in which it bridges the contacts 30, 33 and 37, but in this instance it will be the signaling lamps 35 and 39 which are flashed.

The disclosed embodiments are representative of presently preferred forms of the invention, but are intended to be illustrative rather than definitive thereof. The invention is defined in the claims.

I claim:

1. Apparatus for controlling an electric circuit comprising electrically conductive, homogeneous control means forming part of said circuit and being adjustable between circuit opening and circuit closing conditions, said control means having an initial, thermally unstable, configuration at a temperature below a predetermined temperature such as to establish one of said circuit conditions and being responsive to reaching said predetermined temperature to change forcibly to a second, thermally stable configuration such as to establish the other of said circuit conditions; resilient holding means acting on said control means and yieldably maintaining the latter in said initial configuration, said control means being operable to overcome said holding means and change from its initial configuration to said second configuration in response to the temperature of said control means reaching said predetermined temperature, said holding means being operable to return said control means to said initial configuration in response to a reduction in the temperature thereof to one below said predetermined temperature; and means for raising the temperature of said control means to said predetermined temperature.

2. Apparatus as set forth in claim 1 wherein said control means comprises a member composed of nickel-titanium alloy.

3. Apparatus as set forth in claim 2 wherein said alloy is nickel rich.

4. Apparatus as set forth in claim 1 wherein the said control means is substantially immune to changes in temperature below said predetermined temperature.

5. Apparatus as set forth in claim 1 wherein said holding means is operable to restore said control means to said initial configuration automatically following reduction of its temperature below said predetermined temperature.

6. Apparatus as set forth in claim 1 including a contact carried by said control means.

7. Apparatus for controlling an electric circuit comprising fixed contact means; first and second movable contact means; first and second carrier means straddling said fixed contact means and respectively supporting said first and second contact means on opposite sides of said fixed contact means; means coupling said carrier means to each other for conjoint movement and maintaining said first and second contact means in spaced relation such that one only of said movable contact means may engage said fixed contact means at any one time, each of said carrier means being shaped to an initial, thermally unstable configuration at a temperature below a predetermined temperature and being formed of material which when heated to said predetermined temperature changes configuration in such manner as to move one of said movable contact means toward said fixed contact means; and means for alternately heating said first and second carrier means to said predetermined temperature.

8. Apparatus as set forth in claim 7 wherein the material from which each of said carrier means is formed is homogeneous.

9. Apparatus as set forth in claim 8 wherein said material is a nickel-titanium alloy.

10. Apparatus as set forth in claim 7 wherein said carrier means are formed of electrically conductive material and form part of said circuit.

11. Apparatus for controlling an electric circuit comprising fixed contact means; first and second movable contact means; first and second carrier means respectively supporting said first and second movable contact means, each of said carrier means having a thermally stable configuration at a predetermined, critical temperature but being reshaped below said critical temperature in such direction as to assume a first thermally unstable configuration and being formed of material which when heated to said critical temperature tends to return to said thermally stable configuration; means mounting said first and second carrier means in positions such that either of said movable contact means may engage said fixed contact means but in which one only of said movable contact means initially engages said fixed contact means; means for heating said one of said carrier means to said critical temperature whereby said one of said carrier means changes its configuration and moves in a direction to effect disengagement of said one of said movable contact means and said fixed contact means; and means coupling said first and second carrier means for conjoint movement thereof, said mounting means mounting the other of said carrier means in such position that said change of configuration of said one of said carrier means effects movement of said other of said carrier means and a change in the configuration thereof to a second, thermally unstable configuration.

12. Apparatus according to claim 11 wherein the movement of said other of said carrier means in response to said change of configuration of said one of said carrier means is in the same direction that said other of said carrier means was reshaped.

13. Apparatus according to claim 12 wherein the movement of said other of said carrier means effects engagement between the movable contact supported by said other of said carrier means and said fixed contact.

14. Apparatus according to claim 11 wherein said thermally stable configuration of each of said carrier means is arcuate and wherein the reshaped configuration of each of said carrier means also is arcuate.

15. Apparatus according to claim 14 wherein the stable and reshaped arcuate configurations are of different radii.

16. Apparatus according to claim 15 wherein the reshaped configuration has a smaller radius than that of the stable configuration.

17. Apparatus according to claim 11 wherein said movable contact means straddle said fixed contact means.

* * * * *